US007102492B2

(12) United States Patent
Weber

(10) Patent No.: US 7,102,492 B2
(45) Date of Patent: Sep. 5, 2006

(54) VEHICLE TRACKING SYSTEM

(75) Inventor: Charles F. Weber, Dexter, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 71 days.

(21) Appl. No.: 10/695,113

(22) Filed: Oct. 28, 2003

(65) Prior Publication Data

US 2005/0088321 A1 Apr. 28, 2005

(51) Int. Cl.
*B60R 25/10* (2006.01)

(52) U.S. Cl. ............................ 340/426.1; 340/426.22; 340/426.23; 340/426.24; 340/539.13; 340/447; 340/933

(58) Field of Classification Search ................ 340/933, 340/447, 539.1, 539.13, 10.52, 426.19, 429.22, 340/426.23, 426.24, 934, 442
See application file for complete search history.

(56) References Cited

U.S. PATENT DOCUMENTS

| | | | | |
|---|---|---|---|---|
| 4,947,151 | A | 8/1990 | Rosenberger | |
| 5,289,369 | A | 2/1994 | Hirshberg | |
| 6,384,740 | B1 * | 5/2002 | Al-Ahmed | 340/936 |
| 6,420,967 | B1 | 7/2002 | Ghabra et al. | |
| 6,438,467 | B1 | 8/2002 | Pacsai | |
| 6,587,040 | B1 * | 7/2003 | Seto | 340/426.1 |
| 6,847,892 | B1 * | 1/2005 | Zhou et al. | 701/213 |
| 2001/0032236 | A1 | 10/2001 | Lin | |
| 2002/0126005 | A1 * | 9/2002 | Hardman et al. | 340/442 |
| 2003/0006895 | A1 | 1/2003 | Drake et al. | |

* cited by examiner

*Primary Examiner*—Julie Bichngoc Lieu
(74) *Attorney, Agent, or Firm*—Brinks Hofer Gilson & Lione

(57) ABSTRACT

A system for identifying the location of a vehicle is provided. The system includes a sensor, a receiver, a processor, and a database. The sensor is configured to determine the status of a component and transmit a component ID signal and a component status signal to a controller for monitoring status of the vehicle. The receiver is located external to the vehicle and configured to collect the signals from the sensor. The processor is in communication with the receiver and adapted to correlate the component ID signal and the location of the receiver. The database is in communication with the processor and configured to store the component ID and the receiver location.

22 Claims, 3 Drawing Sheets

VEHICLE TRACKING SYSTEM

BACKGROUND

1. Field of the Invention

The present invention generally relates to a system for tracking a vehicle. More specifically, the invention relates to a system for tracking a vehicle using vehicle component ID signals.

2. Description of Related Art

Systems for tracking vehicles are commercially available today. One use for tracking systems includes locating stolen vehicles. These systems are typically expensive aftermarket products where a transmitter is attached to the vehicle. In the event the vehicle is stolen, a remote unit is used to activate the transmitter. The remote unit is then used to determine the location of the vehicle. Another use for vehicle tracking systems includes businesses with a fleet of cars for rental or transportation services. Knowing the location of each vehicle can significantly improve logistical planning and provide statistical metrics regarding vehicle operation and route choice.

Also related to the development of vehicles, sensing the status of vehicle components and subsystems is important for controlling and maintaining the performance of the vehicle. For example, if a vehicle has under-inflated tires, performance and handling of the vehicle may degrade. Recent developments in the automobile industry indicate that the government may mandate low tire pressure warning systems on all automobiles. One solution for monitoring tire pressure includes sensing the tire pressure internal to the tire and transmitting the pressure to a vehicle controller. The data from each transmitter can include a unique ID for each wheel providing the operator with the identity of the tire containing inadequate pressure.

In view of the above, it is apparent that there exists a need for an improved vehicle tracking system and systems for monitoring the status of vehicle components.

SUMMARY

In satisfying the above need, as well as overcoming the enumerated drawbacks and other limitations of the related art, the present invention provides a system for identifying the location of a vehicle. The system includes a sensor, a receiver, a processor, and a database. The sensor is configured to determine the status of a component and to transmit a component ID signal and a component status signal to a vehicle controller for monitoring status of the component. The receiver of the tracking system is located external to the vehicle and configured to collect the signals from the sensor. In communication with the receiver is the processor of the tracking system, which is adapted to correlate the component ID signal and determine the location of the receiver. In communication with the processor is the tracking system database, which is configured to store the component ID signal and the receiver location.

In another aspect of the invention, the sensor is a pressure sensor mounted inside a tire, the component, and includes a radio frequency transmitter for communicating with the status monitoring controller.

In yet another aspect of the invention, the processor is configured to correlate the component ID signal with a time that the component ID signal was received. Further, a vehicle identification number can be correlated with the component ID signal. The processor and database may be located locally with the receiver or, alternatively, the processor may be located in a central location to service a plurality of receivers. To facilitate communication between the receiver and processor, a second transmitter and second receiver acting as relay, can be connected between the first receiver and the processor allowing the first receiver and the processor to be located miles apart.

In yet another aspect of the present invention, the system includes a user interface. The user interface can be used to indicate the time the component ID signal was received and location where the component ID signal was received. Alternatively, the user interface may allow a vehicle identification number to be entered, allowing the user interface to indicate the time of and location where a component ID signal was received that correlated to the vehicle identification number.

Further objects, features and advantages of this invention will become readily apparent to persons skilled in the art after a review of the following description, with reference to the drawings and claims that are appended to and form a part of this specification.

DETAILED DESCRIPTION

Figure 1:
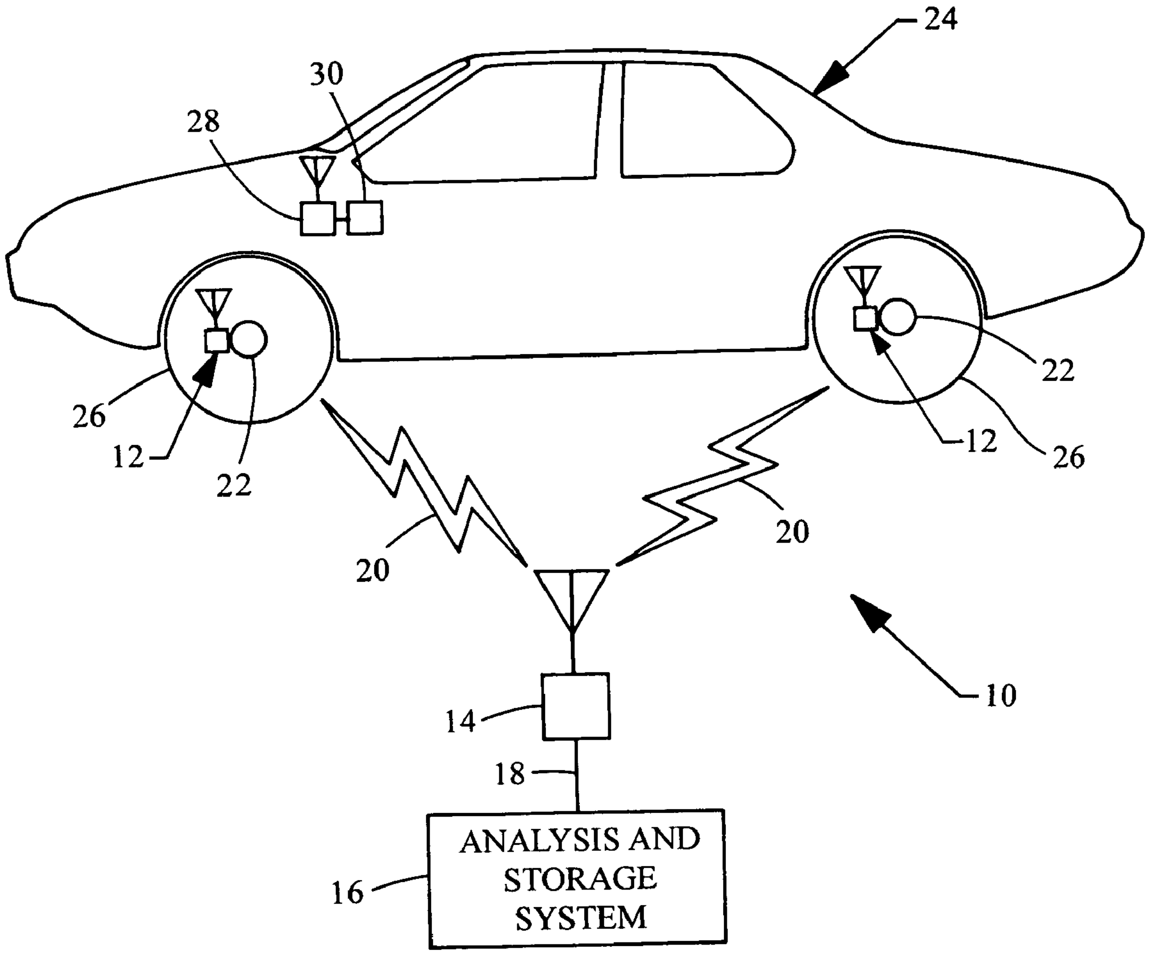
FIG. 1 is a diagrammatic view of a vehicle tracking system in accordance with the present invention.

Referring now to FIG. 1, a system embodying the principles of the present invention is illustrated therein and designated at 10. The system 10 includes a sensor assembly 12, a receiver 14, and an analysis and storage system 16. The sensor assembly 12 is used by the vehicle 24 to monitor the pressure of one of the tires 26. The sensor assembly 12 is mounted to the wheel 22 of the vehicle 24. Locating the sensor assembly 12 inside the tire 26 is not only conducive to tire pressure measurement, it also increases the likelihood the sensor assembly 12 will remain intact if the vehicle 24 is stolen. In the latter instance, removing the sensor assembly 12 would involve disassembly of the tire 26 and require special tools, something car thieves would not readily do or have.

The sensor assembly 12 transmits a tire pressure signal to a receiver 28 in the vehicle 24, which is in communication with the vehicle controller 30. The vehicle controller 30 monitors the tire pressure signal and alerts the operator in the event the tire pressure is low. In addition, the controller 30 indicates to the operator the location of the tire by correlating the component ID with the wheel location. In normal operation, the sensor assembly 12 transmits the tire pressure signal and the component ID signal to the in-vehicle receiver 28. However, a receiver 14 of the tracking system 10 may also receive the component ID information as indicated by line 20.

The receiver 14 is located at convenient locations, such as at intersections, traffic signals, bridges, or street lights, and may be powered from an electrical connection to the power source for the traffic signal or street light, or alternatively, the receiver 14 may be self-powered by battery or solar power. The receiver 14 is further connected to an analysis and storage system 16, as indicated by connection line 18.

Utilizing a radio frequency (RF) transmission for the communication between the sensor 12 and the receivers 28 and 14 provides a cost effective communication link. However, other frequencies and encoding methodologies may be used to improve communication, reliability, and range.

Figure 2:
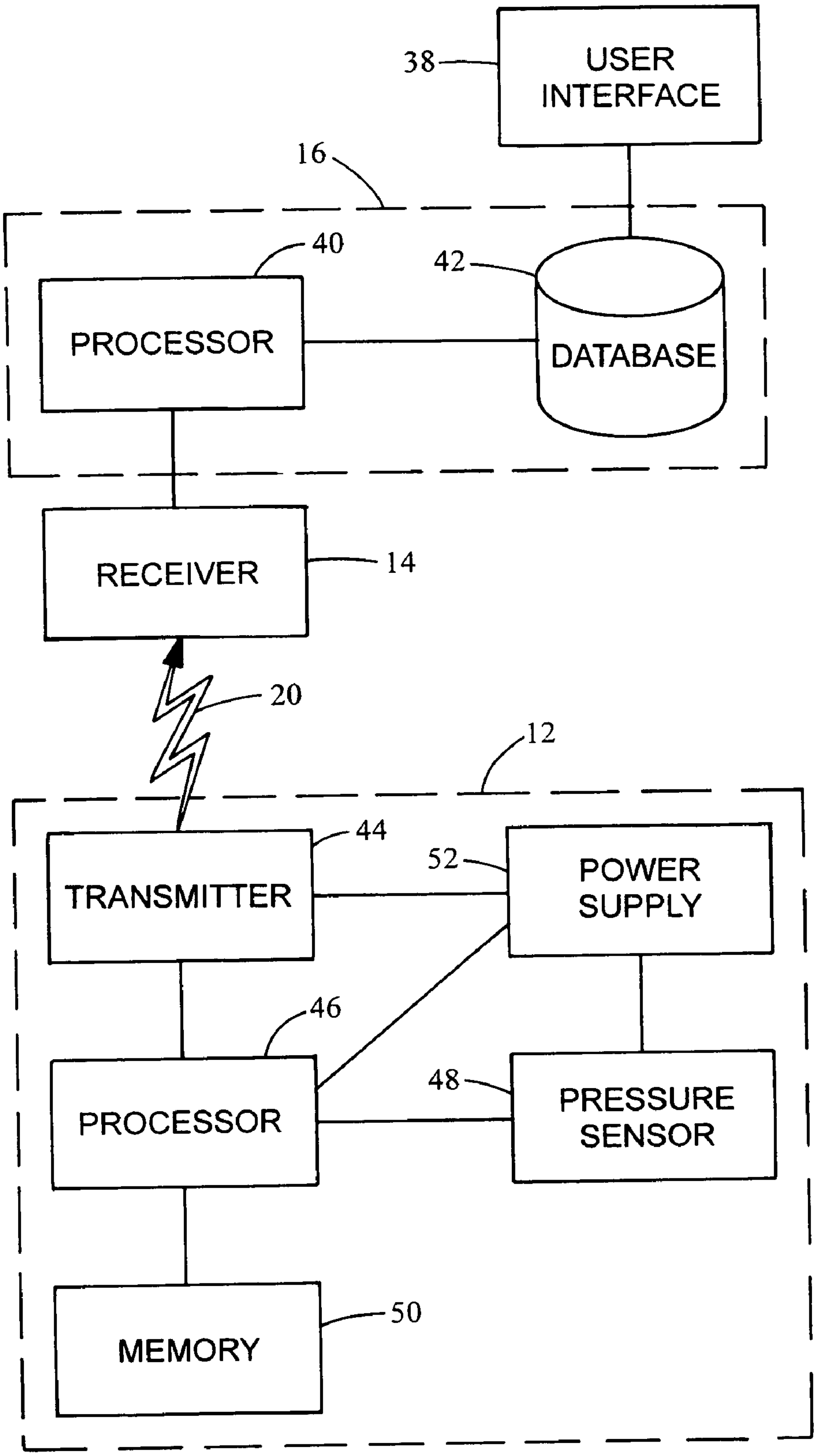
FIG. 2 is a view of a block diagram of a vehicle tracking system and its subcomponents in accordance with the present invention.

Now referring to FIG. 2, the sensor assembly 12 includes a pressure sensor 48 for sensing the air pressure of the tire. The pressure sensor 48 may be a transducer or other sensor adapted for sensing pressure, which provides a pressure signal to a processor 46. The processor 46 is in communication with a memory 50. The memory 50 can be a read only memory, although random access memories and other types of programmable memories are also contemplated according to the present invention.

The memory 50 stores a component ID, which may be made up of numeric digits, alphanumeric digits, or both. Since all tires operating in the system 10 would preferably be assigned a unique ID, it is envisioned that at least $2^{64}$ combinations may be needed to uniquely identify each tire or component. In addition, the memory 50 may also include a lookup table or transformation for calibrating the pressure sensor signal. The processor 46 communicates the component ID and pressure signals to a transmitter 44, which may be a radio frequency transmitter, although other transmitters are also contemplated by the present invention. The transmitter 44, processor 46, and pressure sensor 48 communicates with power source 52. Power source 52 includes a battery or other power supply means.

The component ID and pressure sensor signal are transmitted from the transmitter 44 of the sensor assembly 12 to the receiver 14, as indicated by transmission line 20. As previously mentioned, the receiver 14 is placed external to the vehicle and may be located at intersections, bridges, or similar locations.

The receiver 14 is in communication with the analysis and storage system 16. The analysis and storage system 16 itself includes a processor 40, a user interface 38, and a database 42. The receiver 14 can be designed to handle multiple radio frequencies and protocols corresponding to multiple vendors. Also, processor 40 can include software that recognizes multiple data protocols and component ID formats corresponding to multiple vendors.

The processor 40 receives the component ID signal from the receiver 14. The processor 40 stores the component ID and the location of the receiver 14, adding a time stamp, in the database 42. In addition, this data may be correlated with a vehicle identification number. The vehicle identification number (VIN) can be loaded into the database 42 using the user interface 38, which is in communication with the database 42. An operator can access or correlate the data based on any of the entries including component ID, location, time, or VIN number.

Figure 3:
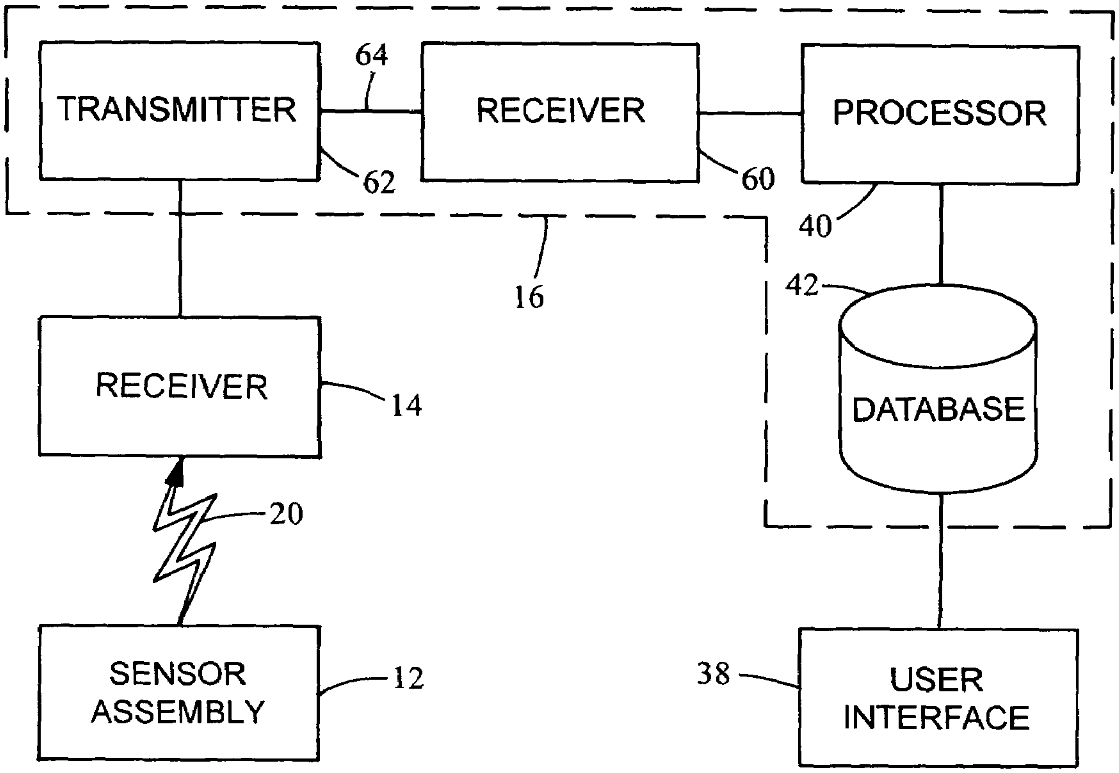
FIG. 3 is a vehicle tracking system including a remote centralized processor and database in accordance with the present invention.

Now referring to FIG. 3, the storage and analysis system 16 can also be located in a central location remote from the receiver 14. In this aspect of the invention, the sensor assembly 12 transmits the component ID signal along transmission line 20 to the receiver 14. The receiver 14 communicates the component ID to a transmitter 62. This transmitter 62 transmits the component ID and location information to a central receiver 60, as indicated by line 64. The transmission indicated by line 64 may be a wire connection or wireless connection and may span several miles. Once the central receiver has received these signals, the receiver 60 provides the component ID signal and location information to the processor 40.

The processor 40 stores the component ID, the receiver location, and the time in the database 42. In addition, the database 42 may include a vehicle identification number correlated to the component ID, allowing the received data to be correlated with the vehicle identification number. The vehicle identification number can be entered into the database 42 using the user interface 38 which is in communication with the database 42. An operator can access or correlate the databased on any of the entries including component ID, location, time, or VIN number.

In another aspect of the invention user interface 38 can access the database 42 to retrieve the component IDs or VIN numbers associated with a receiver location to indicate traffic density at that location. Further, the traffic density may be displayed by predetermined time ranges.

As a person skilled in the art will readily appreciate, the above description is meant as an illustration of implementation of the principles this invention. Although the embodiment described discusses tire pressure sensors, the present invention also contemplates utilizing sensors for monitoring other vehicle parameters. This description is not intended to limit the scope or application of this invention in that the invention is susceptible to modification, variation and change, without departing from spirit of this invention, as defined in the following claims.

I claim:

1. A system for identifying a location of a vehicle, the vehicle including a controller for monitoring status of a component of the vehicle, the system comprising:

a sensor configured to transmit a component ID signal and a component status signal;

a first receiver remote from the vehicle and configured to collect a component ID signal from the sensor;

a processor in communication with the first receiver and adapted to receive the component ID signal; and a database in communication with the processor for storing the component ID and the receiver location, wherein the processor is configured to correlate the component ID with a vehicle ID and a location of the first receiver to determine a vehicle location.

2. The system according to claim 1 wherein the processor is configured to correlate the component ID with a time that the component ID was received.

3. The system according to claim 1, wherein the sensor includes a radio frequency transmitter.

4. The system according to claim 1, wherein the sensor is a pressure sensor.

5. The system according to claim 1, wherein the sensor is mounted inside a tire.

6. The system according to claim 1, wherein the sensor is a tire pressure sensor mounted to a wheel of the vehicle.

7. The system according to claim 1, wherein the component ID signal and the location of the first receiver are transmitted to the processor and the processor is located in a remote location to service a plurality of receivers.

8. The system according to claim 7, further comprising a second transmitter and second receiver connected between the first receiver and the processor.

9. The system according to claim 1, wherein the component ID has greater than $2^{64}$ combinations.

10. The system according to claim 1, wherein a vehicle identification number is correlated with the component ID signal.

11. The system according to claim 1, further comprising a user interface that indicates a time and the location the component ID was received.

12. The system according to claim 1, wherein the user interface indicates a time and the location that a component ID was received in response to a vehicle identification number input.

13. The system according to claim 1, wherein the user interface indicates the traffic density based on the location of the receiver.

14. A system for identifying a location of a vehicle, the vehicle including a controller for monitoring status of a component of the vehicle, the system comprising:

a sensor for measuring a tire pressure and configured to transmit a component ID signal and a component status signal:

a receiver remote from the vehicle and configured to collect signals from the sensor;

a processor in communication with the receiver to obtain the component ID; and a database in communication with the processor for storing the component ID and the receiver location, wherein the sensor is a tire pressure sensor mounted to a wheel of the vehicle, a wherein the processor is configured to correlate the component ID with a vehicle ID and a location of the first receiver to determine a vehicle location.

15. The system according to claim 14, wherein the processor is configured to correlate the component ID with a time that the component ID was received.

16. The system according to claim 14, wherein the sensor includes a radio frequency transmitter.

17. The system according to claim 14, wherein the component ID signal and the location of the receiver are transmitted to the processor and the processor is located in a central location to service a plurality of receivers.

18. The system according to claim 14, wherein the component ID has greater than $2^{64}$ combinations.

19. The system according to claim 14, wherein a vehicle identification number is correlated with the component ID signal.

20. The system according to claim 14, further comprising a user interface that indicates a time and the location the component ID was received.

21. The system according to claim 14, wherein the user interface indicates a time and the location that a component ID was received in response to a vehicle identification number input.

22. The system according to claim 14, wherein the user interface indicates the traffic density based on the location of the receiver.

* * * * *

UNITED STATES PATENT AND TRADEMARK OFFICE

CERTIFICATE OF CORRECTION

PATENT NO. : 7,102,492 B2
APPLICATION NO. : 10/695113
DATED : September 5, 2006
INVENTOR(S) : Charles F. Weber It is certified that error appears in the above-identified patent and that said Letters Patent is hereby corrected as shown below:

Column 5, in claim 14, line 14, after “wheel of the vehicle,” delete “a”.

Signed and Sealed this

Twenty-fourth Day of April, 2007

JON W. DUDAS
*Director of the United States Patent and Trademark Office*